United States Patent
Shinmura et al.

(12)

(10) Patent No.: US 6,289,281 B1
(45) Date of Patent: *Sep. 11, 2001

(54) INTEGRATED CONTROL SYSTEM OF VEHICLE

(75) Inventors: Tomoyuki Shinmura; Kenji Kodaka; Yoichi Sugimoto; Shohei Matsuda, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/199,334

(22) Filed: Nov. 25, 1998

(30) Foreign Application Priority Data

Dec. 12, 1997 (JP) .................................... 9-362577

(51) Int. Cl.⁷ .................................................. G06F 17/00
(52) U.S. Cl. ..................... 701/301; 303/140; 303/189; 340/903; 340/435; 701/72; 701/91
(58) Field of Search ................................. 701/1, 36, 41, 701/42, 48, 70–72, 91, 96, 300, 301; 303/140, 146, 147, 186, 189; 340/901, 903, 435, 436, 438; 342/454

(56) References Cited

U.S. PATENT DOCUMENTS

| | | | |
|---|---|---|---|
| 4,809,181 | * | 2/1989 | Ito et al. ................................ 701/72 |
| 5,251,135 | * | 10/1993 | Serizawa et al. ....................... 701/42 |
| 5,418,727 | * | 5/1995 | Ikeda et al. ............................ 701/96 |
| 5,467,283 | * | 11/1995 | Butsuen et al. ....................... 701/301 |
| 5,540,298 | * | 7/1996 | Yoshioka et al. ..................... 180/169 |
| 5,745,870 | * | 4/1998 | Yamamoto et al. ................... 701/301 |
| 5,839,798 | * | 11/1998 | Monzaki et al. ...................... 303/146 |
| 5,931,546 | * | 8/1999 | Nakashima et al. .................. 303/146 |
| 6,035,251 | * | 3/2000 | Hac et al. ............................... 701/70 |
| 6,053,583 | * | 4/2000 | Izumi et al. ........................... 303/146 |

FOREIGN PATENT DOCUMENTS 6-298022   10/1994   (JP) .

* cited by examiner

Primary Examiner—William A. Cuchlinski, Jr.
Assistant Examiner—Edward Pipala
(74) Attorney, Agent, or Firm—Arent Fox Kintner Plotkin & Kahn, PLLC

(57) ABSTRACT

An integrated vehicle control system including: contact possibility determining means for determining whether a possibility of contact with an obstacle is great, first brake control means for controlling operation of the vehicle brake in response to the possibility of contact, vehicle behavior detecting means for detecting parameters such as the vehicle yaw rate, vehicle behavior control means for calculating a value such as the error between the detected yaw rate and a reference yaw rate and calculating a manipulated variable (braking force difference) such that the veerability of vehicle is enhanced, and second brake control means for controlling operation of the vehicle brake in response to the calculated manipulated variable. In the system, the vehicle behavior control means advances the timing of the calculation of the manipulated variable or increases the manipulated variable, when the possibility of contact is great, whereby effecting the vehicle behavior sufficient for avoiding an obstacle, while enhancing the vehicle veerability.

20 Claims, 12 Drawing Sheets

INTEGRATED CONTROL SYSTEM OF VEHICLE

BACKGROUND OF THE INVENTION

1. Field of the Invention

This invention relates to an integrated control system of a vehicle, more particularly to an integrated vehicle control system which integrates two kinds of controls, comprised of that to avoid an obstacle present on the course of travel ahead of the vehicle and that to control the vehicle to veer so as to ensure steerability of the vehicle.

2. Description of the Related Art

Various obstacle avoidance techniques have hitherto been proposed. For example, Japanese Laid-open Patent Application Hei 6(1994)-298022 teaches detecting the distance to an obstacle (e.g., another vehicle running ahead on the road) and automatically operating a brake, if needed, so as to avoid the contact with the obstacle.

Moreover, there has been proposed a technique to control the braking forces independently or separately for the four wheels to generate a yaw moment (moment about the gravitational direction at the center of the gravity of the vehicle) so as to control the behavior or motion of the vehicle. More specifically, the technique detects the slip angle and angular velocity of the vehicle body to determine whether the vehicle tends to oversteer, while detecting the actual yaw rate (yaw angular velocity) to determine the error from a desired yaw rate to determine whether the vehicle tends to understeer.

In this technique, the front wheels or rear wheels are braked in response to the determined results to control the vehicle yaw moment, thereby ensuring stability when the vehicle corners or turns.

In the obstacle avoidance control mentioned above, the automatic brake operation may cause the vehicle driver to experience annoyance if he has the intention to avoid the obstacle by himself. For that reason, the obstacle avoidance control is configured such that the automatic braking is only effected after the possibility of contact has grown to a great extent. However, once the automatic braking is effected, it instantaneously generates large braking forces. This may sometimes make the vehicle response to the vehicle driver's steering insufficient.

Such an obstacle avoidance control and vehicle behavior control as mentioned above could be integrated together so as to, for example, to enhance the veerability of the vehicle when the vehicle tends to understeer. Since, however, the vehicle behavior control is configured to respond to the vehicle driver's manipulation, if the automatic braking yields large braking forces instantaneously, the integrated control could fail to ensure vehicle stability sufficient for avoiding an obstacle on the road.

SUMMARY OF THE INVENTION

An object of the invention is therefore to overcome the foregoing problems by providing an integrated control system of a vehicle which integrates the aforesaid obstacle avoidance control and the vehicle behavior control properly, whereby effecting the vehicle behavior sufficient for avoiding an obstacle, while ensuring vehicle steerability or veerability.

To achieve this object, the invention provides a system for controlling the behavior of a vehicle having a brake which is controllable in a braking force applied at a left wheel and a right wheel of the vehicle independently, comprising obstacle detecting means for detecting an obstacle present ahead on a course of travel of the vehicle; contact possibility determining means for determining whether a possibility that the vehicle will come into contact with the obstacle is present based on an output of the obstacle detecting means; first brake control means for controlling operation of the brake in response to a result of the determination of the contact possibility determining means; vehicle behavior detecting means for detecting at least a parameter of the vehicle indicative of behavior of the vehicle; vehicle behavior control means for calculating at least an error, for controlling a vehicle behavior, between the detected parameter and a reference value and for calculating a manipulated variable such that a vehicle veerability is enhanced; and second brake control means for controlling operation of the brake in response to the calculated manipulated variable; wherein the vehicle behavior control means conducts at least one from among procedures to advance the timing of the calculation of the manipulated variable and to increase the manipulated variable, when the contact possibility determining means determines that the possibility of contact is present.

BRIEF EXPLANATION OF DRAWINGS

This and other objects and advantages of the invention will be more apparent from the following description and drawings, in which.

DETAILED DESCRIPTION OF THE PREFERRED EMBODIMENTS

Embodiments of the invention will now be explained with reference to the attached drawings.

Figure 1:
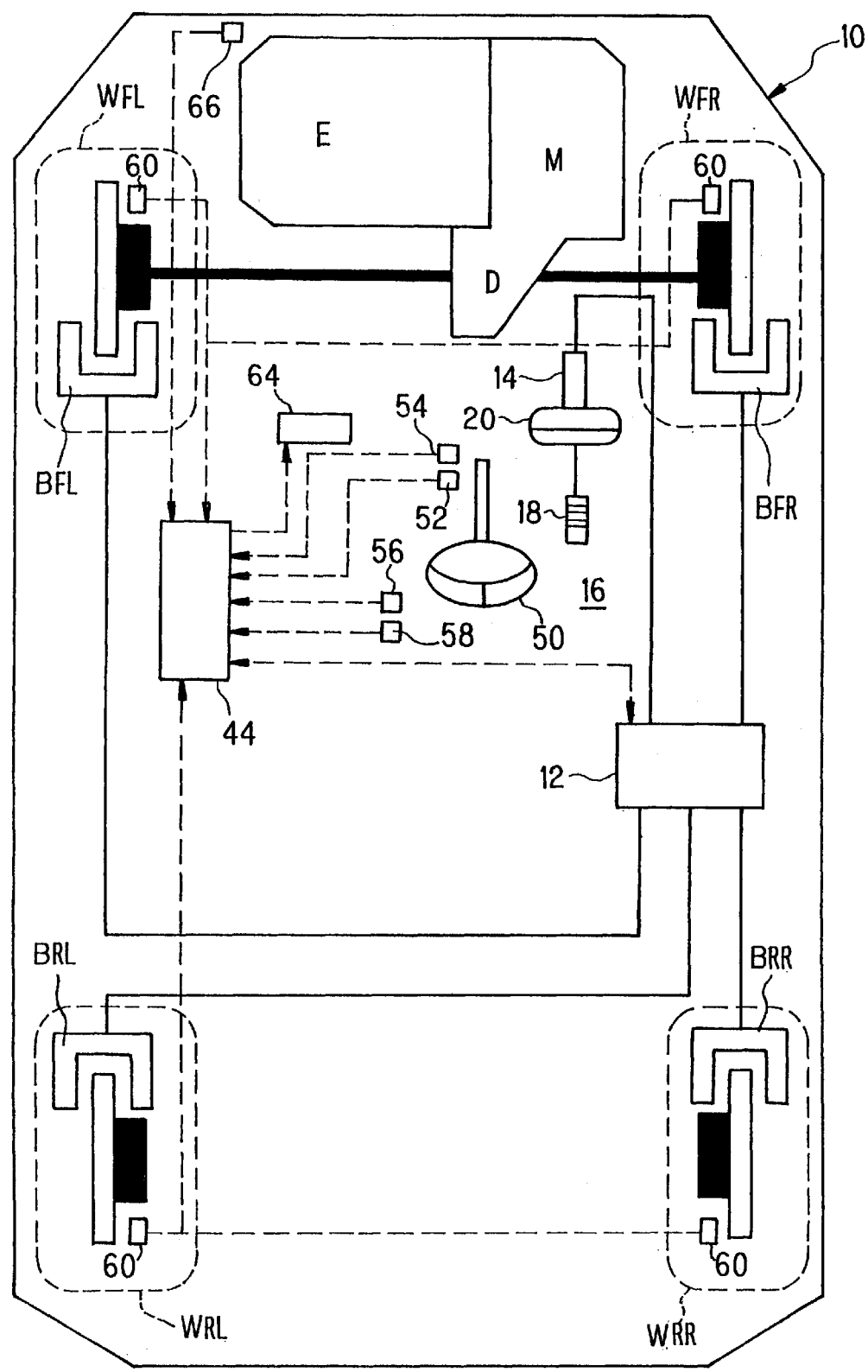
FIG. 1 is an overall schematic view showing the overall configuration of an integrated control system of a vehicle according to the invention.

FIG. 1 is an overall schematic view showing an integrated control system of a vehicle according to the invention.

In the FIG. reference numeral 10 designates a vehicle which has an internal combustion engine E and a transmission M at its front. The transmission M transmits power from the engine E, via a differential D, to the drive axle (not shown) which drive the front wheels W, more specifically the front left and right wheels (rubber tires) WFL, WFR, thereby causing the vehicle 10 to run on the road, while the rear wheels W, i.e., the rear left and right wheels WRL, WRR, rotate freely.

The four wheels W are each equipped with a disk brake having a caliper B. Each of the brake calipers B, specifically the front left and right brake calipers BFL, BFR for the front wheels WFL, WFR and the rear left and right brake calipers BRL, BRR slows or stops the rotation of the associated wheel W by pushing the pad against the disk (neither shown).

The brake calipers B are each connected, via an actuator (hydraulic actuator) 12, to a master cylinder 14. The master cylinder 14 is connected to a master-back 20 (which in turn is connected to a foot brake (brake pedal) 18 provided on the floor of a vehicle driver's seat 16). The master cylinder 14 houses a reservoir (not shown) which outputs brake oil regulated under pressure in response to the boosted foot brake pedal depression. The pressurized brake oil is sent to the actuator 12.

Figure 2:
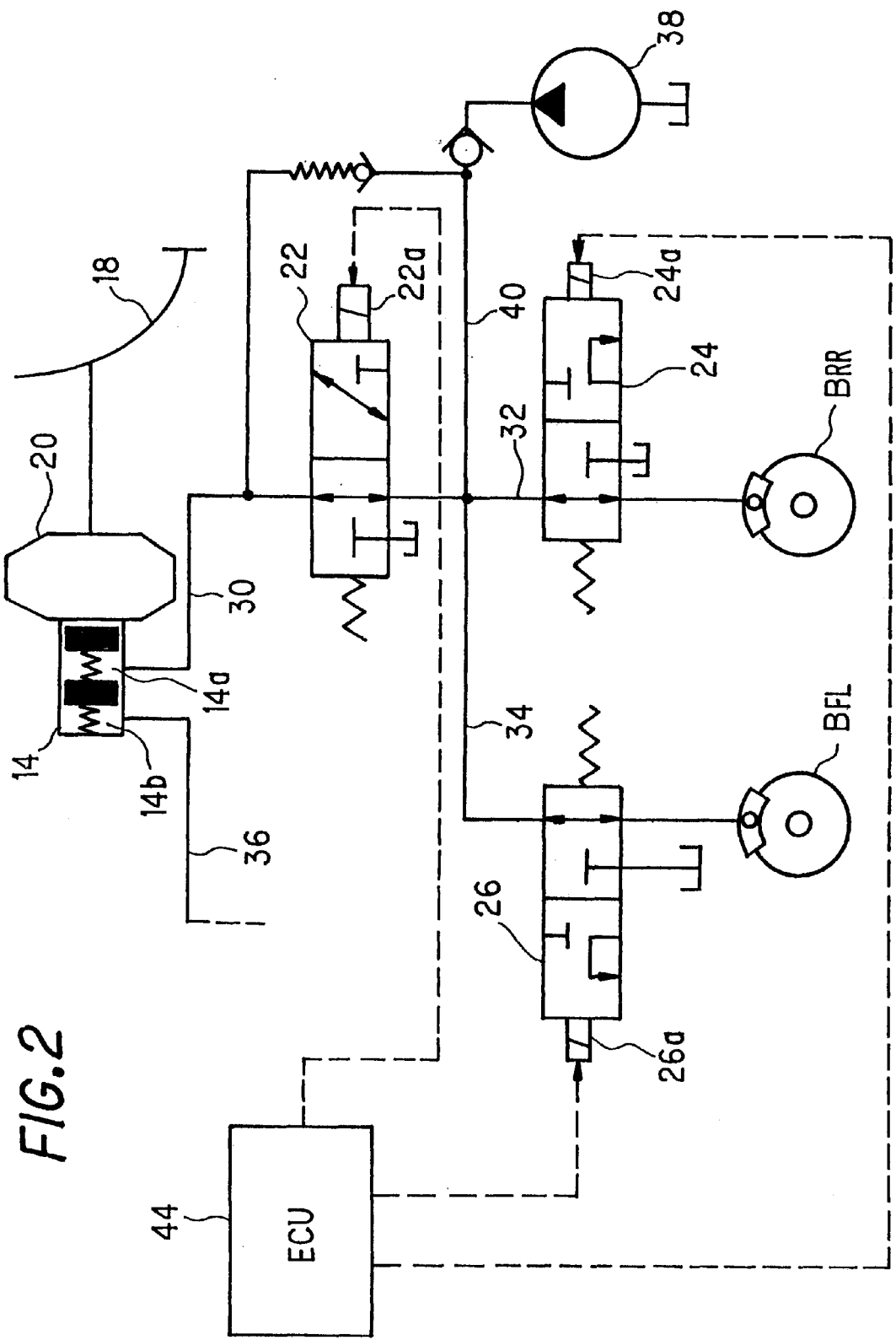
FIG. 2 is a hydraulic circuit diagram showing the details of an actuator provided in the system illustrated in FIG. 1.

FIG. 2 is a hydraulic circuit diagram showing the details of the actuator 12.

As illustrated, the actuator 12 comprises a hydraulic mechanism including electromagnetic directional control valves (spool valves) 22, 24, 26. In the hydraulic mechanism, the master cylinder 14 has a chamber 14a and a chamber 14b. The chamber 14a is connected to the input port of the direction control valve 22 via an oil path 30.

The directional control valves 22, 24, 26 are respectively provided with solenoids 22a, 24a, 26a. Under the normal braking operation, these solenoids 22a, 24a, 26a are switched OFF and the spools are at the illustrated positions. The oil path 30 is accordingly connected to oil paths 32, 34. The pressurized oil from the reservoir in the master cylinder 14 flows via the oil paths 30, 32, 34 to the front left brake caliper BFL and the rear right brake caliper BRR to slow or stop the rotation of the front left wheel WFL and the rear right wheel WRR. With this, when the vehicle driver depresses the foot brake 18 down, the depression force is boosted, and the braking forces corresponding to the brake pedal depression act on these wheels.

The chamber 14b of the master cylinder 14 is similarly connected to the front right brake caliper BFR for the front right wheel WFR and the rear left brake BRL for the rear left wheel WRL, although not shown in the Figure.

As will be explained later, aside from the vehicle driver's braking, when one of the wheels should be braked independently of or separately from the others under the automatic braking operation, the solenoid 22a of the direction control valve 22 is switched ON such that the oil path 30 is connected to the drain port.

For example, if the rear right wheel WRR is to be braked, the solenoid 24a for the brake caliper BRR for the rear right wheel WRR is switched OFF, while the solenoid 26a for the brake caliper BFL for the front left wheel WFL is switched ON. As a result, the pressurized oil pumped by an oil pump 38 flows through an oil path 40 to the rear right brake caliper BRR to brake the rear right wheel WRR. Under this situation, since the solenoid 26a of the valve 26 for the brake caliper BFL of the front left wheel WFL is switched ON, no braking force acts on the wheel WFL. Although not shown, the above will similarly be applied to the braking operation in the front right wheel WFR or the rear left wheel WRL.

Thus, only one desired wheel can be braked by turning the valve solenoid OFF for the brake caliper for the desired wheel and turning the opposite solenoid ON for the opposite valve solenoid, while turning the valve solenoid 22a ON. Saying this reverse, any one from among the four wheels can be relieved from the braking state.

When the valve solenoid 22a is switched ON, while the valve solenoids 24a, 26a are switched OFF, the wheels WFL and WRR are both braked. When the other wheels WFR and WRL are additionally braked by the hydraulic mechanism not shown, all four wheels are automatically braked.

The valve solenoids 22a, 24a, 26a are electrically connected to an ECU (Electronic Control Unit) 44 comprising a microcomputer, and are switched ON/OFF through driver circuits in response to the command signals from the ECU 44.

More specifically, the valve solenoids are subject to duty-ratio control in terms of the Pulse Width Modulation. The respective brake calipers are increased or decreased in pressure by being switched between the state in which the respective brake calipers are connected to the hydraulic power source (i.e., the master-back 20 and the oil pump 38) and the state in which they are connected to the reservoir. Having been configured in this manner, it becomes possible to brake any one from among the wheels at a desired braking force.

Returning to the explanation of FIG. 1, a steering wheel 50 is provided near the driver's seat 16 in the vehicle 10. The steering wheel 50 is mechanically connected to the front wheels WFL, WFR via the gear mechanism and the steering mechanism (neither shown) to steer the front wheels in a desired direction. A steer angle sensor 52 is equipped in the proximity of the steering wheel 50 to generate a signal indicative of the steer angle θ H input by the vehicle driver. A torque sensor 54 is provided at an appropriate location in the gear mechanism and steering mechanism to generate a signal indicative of the steer torque TH.

An accelerometer 56 is provided near the center of the vehicle 10 to generate a signal indicative of the lateral acceleration YG acting on the vehicle laterally or transversely to the vehicle course of travel. A yaw rate sensor 58 is provided at the center of the vehicle to generate a signal indicative of the yaw rate (yaw angular velocity acting at the center of gravity of the vehicle 10 about the gravitational or vertical direction) φ dot. In the specification, "dot" represents the symbol for differentiation.

A wheel speed sensor 60 is provided in the proximity of the respective wheels W to generate a signal indicative of the rotational speed of the associated wheel W.

The signals output from these sensors are sent to the ECU 44. The number of signals of the wheel speed sensor 60 is counted to detect the traveling speed (vehicle speed) of the vehicle 10.

An alarm system (e.g., an audio system or visionary indicator) 64 is provided in the proximity of the driver's seat 16, which alerts the vehicle driver in response to the command signal generated by the ECU 44 indicating that the possibility of contact with an obstacle is high.

A laser radar 66 is provided at an appropriate location near the front bumper of the vehicle 10, which emits a beam of electromagnetic radiation energy and receives reflected energy. The laser radar 66 is connected to the radar output processing unit (comprising a microcomputer, not shown) which detects the distance (relative distance) of an obstacle or object such as another vehicle present on the course of travel ahead of the subject vehicle 10, if any, by measuring the time interval between transmission of the energy and reception of the reflected energy which establishes the range of the obstacle in the beam's path.

The radar output processing unit detects the speed of the obstacle relative to the subject vehicle 10 by differentiating the measured distance. The processing unit also detects the location or direction of the obstacle based on the reflected energy. The output of the processing unit is sent to the ECU 44.

Figure 3:
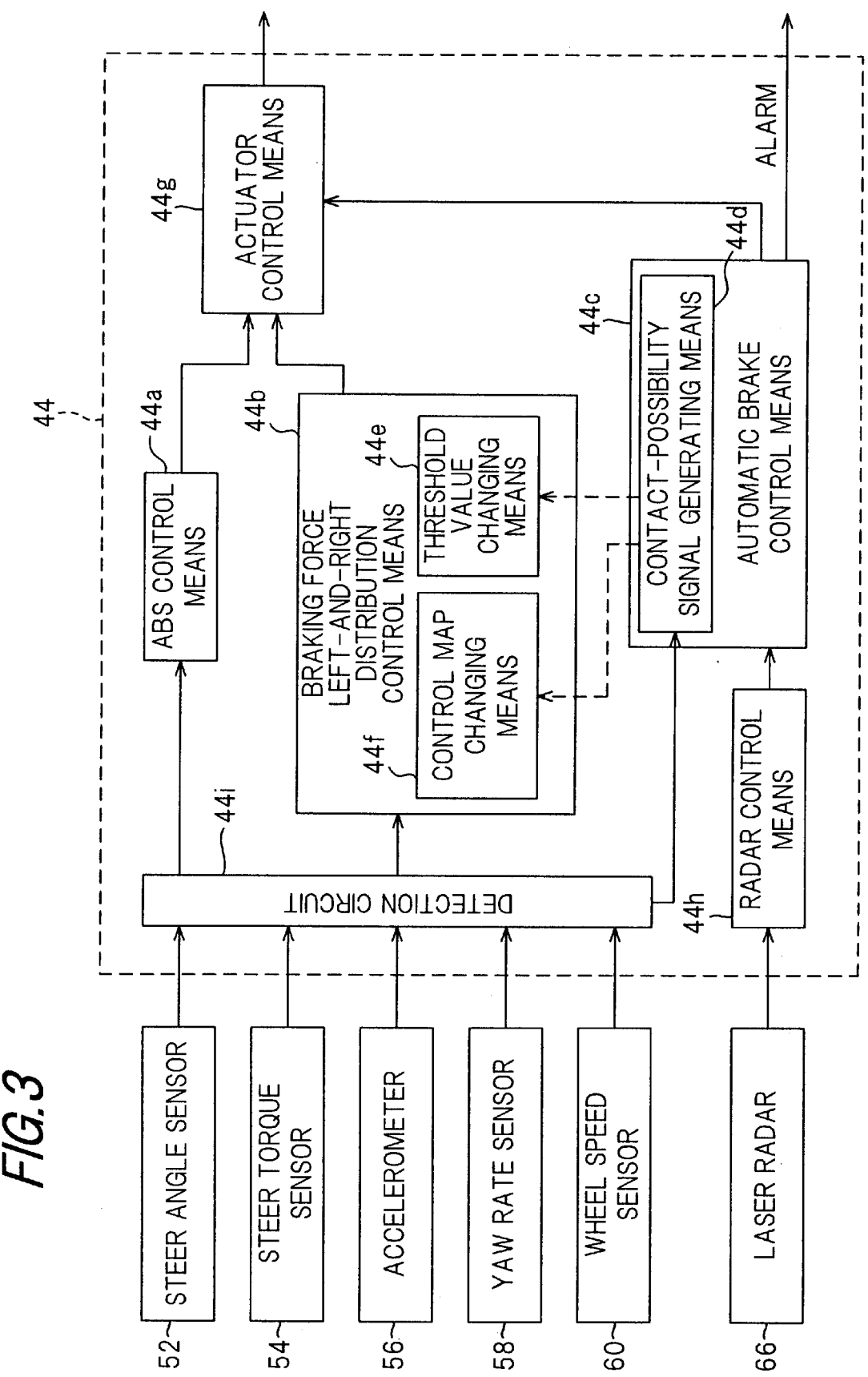
FIG. 3 is a block diagram showing the details of an electronic control unit (ECU) provided in the system illustrated in FIG. 1.

FIG. 3 is a block diagram which illustrates the configuration of the ECU 44 in the functional manner.

As illustrated, the ECU 44 comprises a known ABS (anti-lock brake system) control means 44a, a braking force left-and-right distribution control means 44b and an automatic brake control means 44c.

The automatic brake control means 44c detects an obstacle, if any, present in front of the subject vehicle 10, determines the possibility of contact with the obstacle and conducts automatic braking control in order to avoid contact with the obstacle, if necessary. Specifically, the automatic brake control means 44c has contact-possibility signal generating means 44d which generates (outputs) a contact-possibility signal when the possibility of contact with the obstacle is great.

The braking force left-and-right distribution control means 44b has a threshold value changing means 44e and a control map (characteristics) changing means 44f. The braking force left-and-right distribution control means changes threshold values and control maps when it receives the contact-possibility signal.

The outputs from the ABS control means 44a, the braking force left-and-right distribution control means 44b and the automatic brake control means 44c are sent to the actuator 12 via an actuator control means 44g to control wheel braking forces independently of or separately from each other.

A radar control means 44h is connected to the laser radar 66 through the radar output processing unit and controls to drive the laser radar 66 to scan.

A detection circuit 44i conducts various operations including A/D conversion of the input sensor signals.

The ABS control means determines the wheel slip rate from the signals output from the wheel speed sensor 60 and controls it to a desired range. Since this kind of control is known and has no close relationship with the gist of the subject invention, no further explanation of the ABS control means will be made.

The operation of the automatic brake control system 44c will further be explained.

Figure 4:
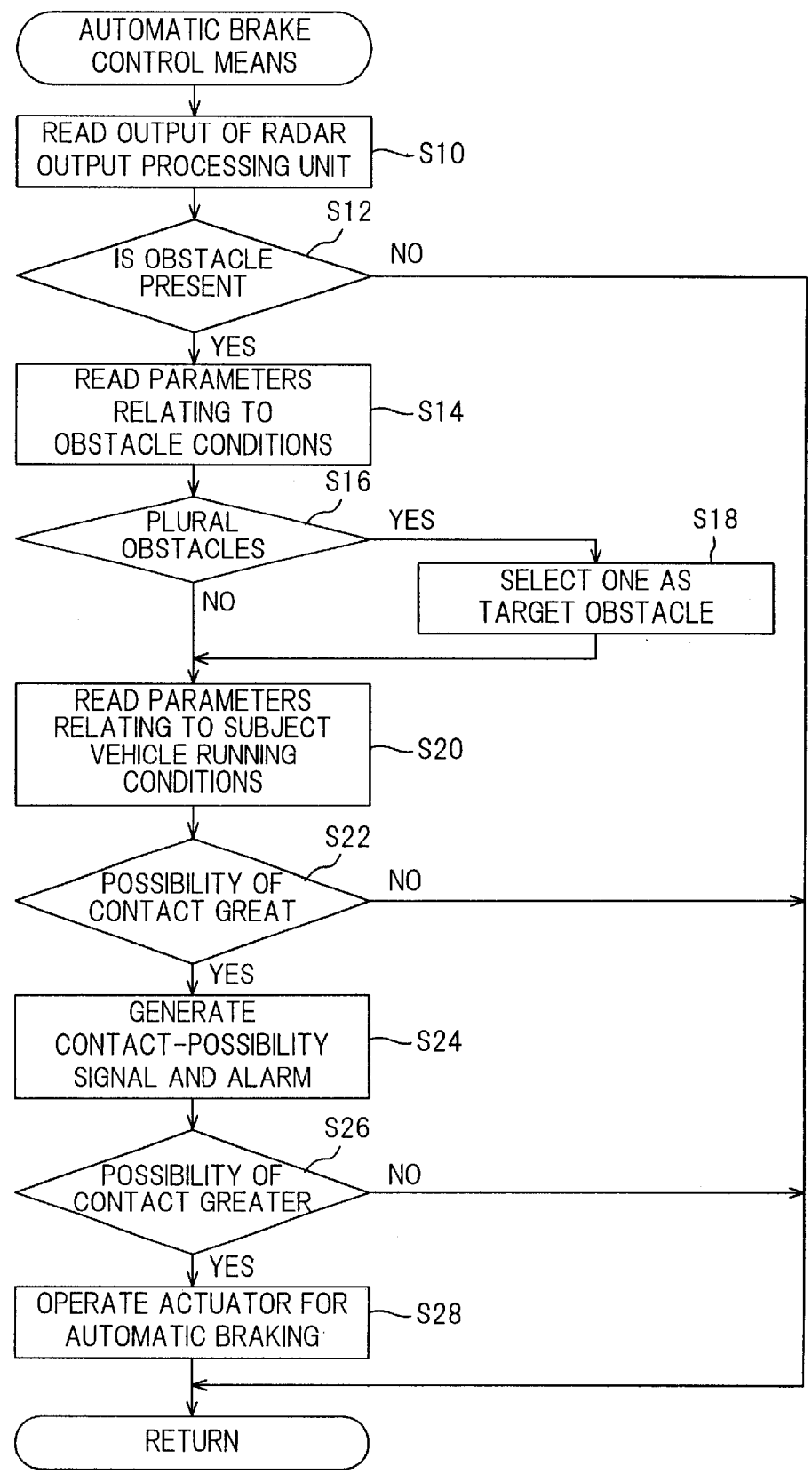
FIG. 4 is a flow chart showing the operation of the system, more particularly the operation of an automatic brake control means illustrated in FIG. 3.

FIG. 4 is a flow chart showing the operation of the system 44c.

Explaining this, the program begins in S10 in which the output of the radar output processing unit is read via the radar control means 44h, and proceeds to S12 in which it is determined whether an obstacle such as another vehicle is present ahead of the subject vehicle 10. When the result in S12 is negative, the program skips the following steps.

When the result in S12 is affirmative, the program proceeds to S14 in which the conditions of the obstacle, i.e., the distance from the subject vehicle 10 relative to the obstacle (relative distance), the traveling speed of the obstacle relative to the speed of the subject vehicle 10 (relative speed), and the acceleration or deceleration of the obstacle, etc., are read or calculated.

The program then proceeds to S16 in which it is determined whether the number of obstacles detected is plural, and when the result is affirmative, the program proceeds to S18 in which the one from among from the plural obstacles whose possibility of contact with the subject vehicle 10 is highest is selected as a target obstacle. When the result in S16 is negative, the program skips S18.

The program then proceeds to S20 in which the parameters relating to the running conditions of the subject vehicle 10, i.e., the vehicle speed (traveling speed) are read, and to S22 in which it is determined whether the possibility of contact with the (target) obstacle is great. This is done by comparing the relative distance (with respect to the relative speed) with a threshold value (boundary). The threshold value is prepared as mapped data to be retrieved using the relative distance and the relative speed.

Figure 5:
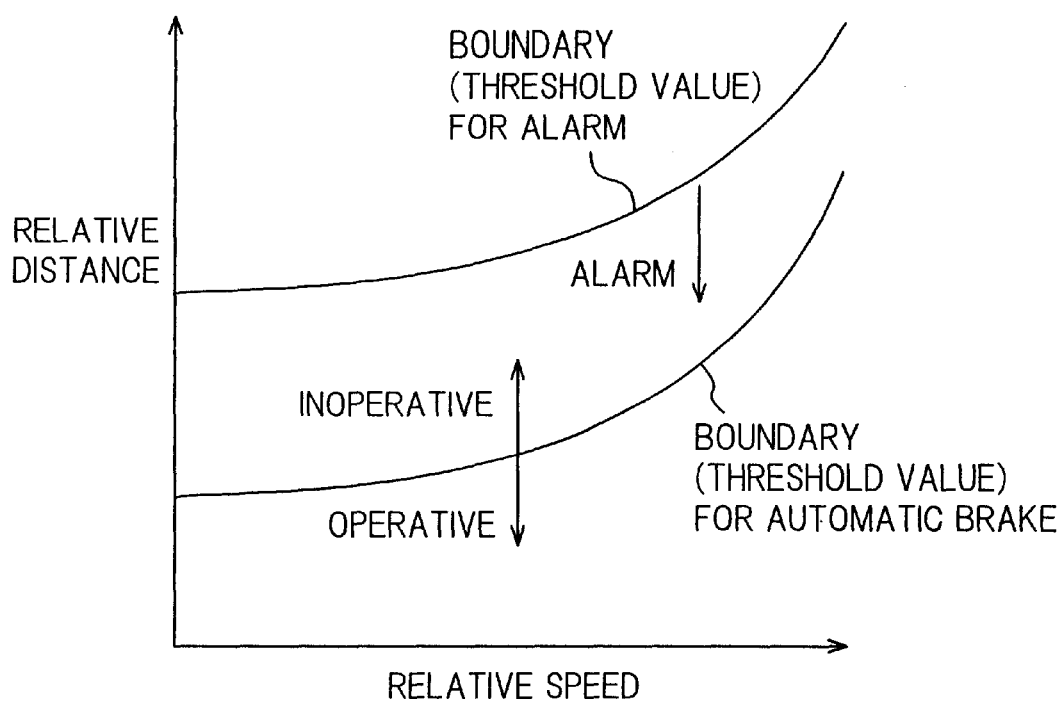
FIG. 5 is a graph showing the characteristics (mapped data) of threshold values to be used in determining whether the possibility of contact with an obstacle is great, referred to in the flow chart of FIG. 4.

FIG. 5 is a graph showing the characteristics of the threshold value (boundary). As illustrated, a first boundary (threshold value) and a second boundary (threshold value) are set with respect to the relative distance and the relative speed. The first boundary determines whether the possibility of contact is great, more specifically the first boundary defines a first threshold value for determining whether the alarm should be conducted.

The second boundary similarly determines whether the possibility of contract is greater, more specifically the second boundary defines a second threshold value for determining whether the automatic braking should be implemented to avoid contact with the obstacle. The first boundary is set such that the relative distance (with respect to the relative speed) is larger than at the second boundary. In other words, they are set such that the alarm first takes place and, if the relative distance is further decreased to be below the second boundary, then the automatic braking takes place.

In S22, the read or detected relative distance (relative to the detected relative speed) is compared with the first threshold value to determine whether the detected relative speed is less than the first threshold value. If it is not, the possibility of contact is determined to be not great and the program skips S24 and on.

On the other hand, when the result in S22 is affirmative, the program proceeds to S24 in which the alarm system 24 is operated to inform the vehicle driver that the possibility of contact is great. At the same time, the contact-possibility signal generating means 44*d* generates and sends the contact-possibility signal to the threshold value changing means 44*e* and the control map changing means 44*f*.

The program then proceeds to S26 in which it is determined whether the possibility of contact further increases. Specifically, the detected relative distance (with respect to the relative speed) is compared with the second threshold value (second boundary) and when it is found that the detected relative distance is not less than the second threshold value the program skips the following step.

On the other hand, if it is found that the detected relative distance is less than the second threshold value, it is determined that the possibility of contact is greater. The program then proceeds to S28 in which the actuator 12 is brought into operation to effect the aforesaid automatic braking. Specifically, this is done by turning the valve solenoid 22*a* ON, while turning both the valve solenoids 24*a*, 26*a* OFF to brake all the four wheels.

Figure 6:
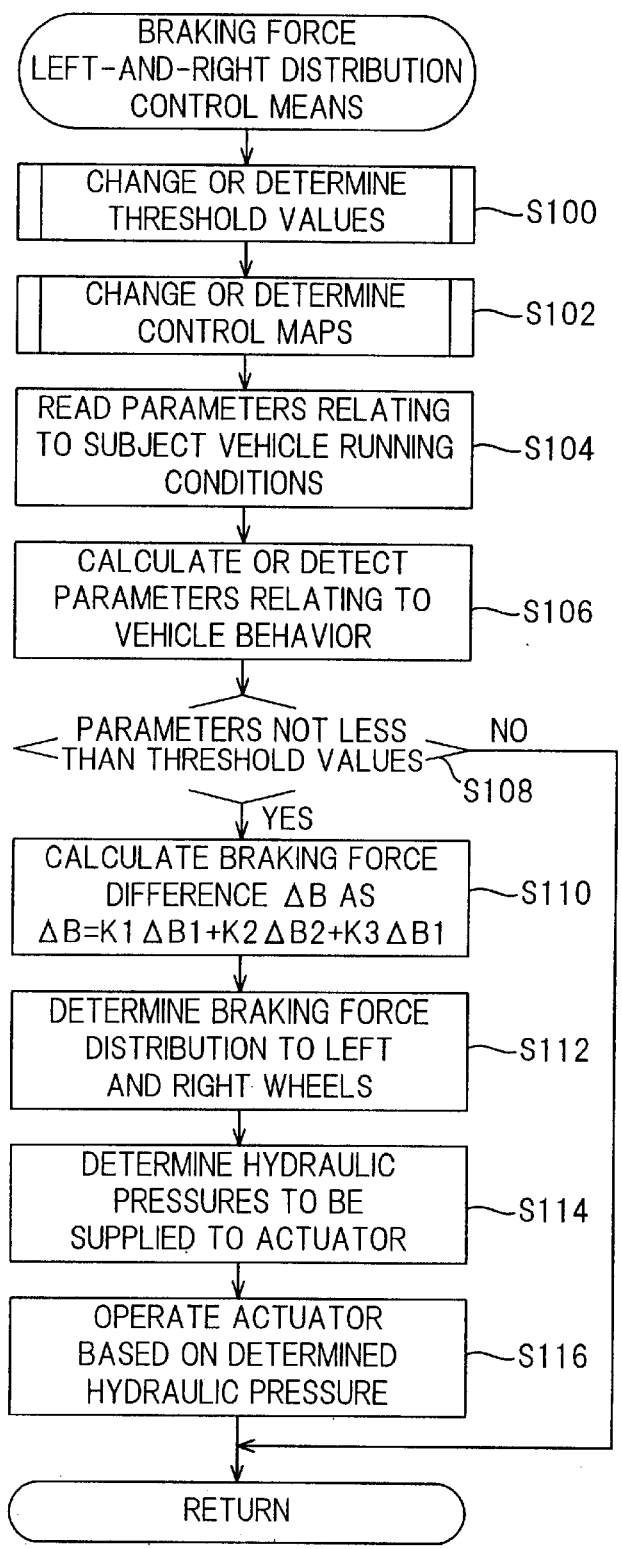
FIG. 6 is a flow chart showing the operation of the system, more particularly the operation of a braking force left-and-right distribution control means illustrated in FIG. 3.

FIG. 6 is a flow chart showing the operation of the aforesaid braking force left-and-right distribution control means 44*b*.

The program starts in S100 in which threshold values, different from those shown in FIG. 5, are changed or determined. This is done by the aforesaid threshold value changing means 44*e*.

Figure 7:
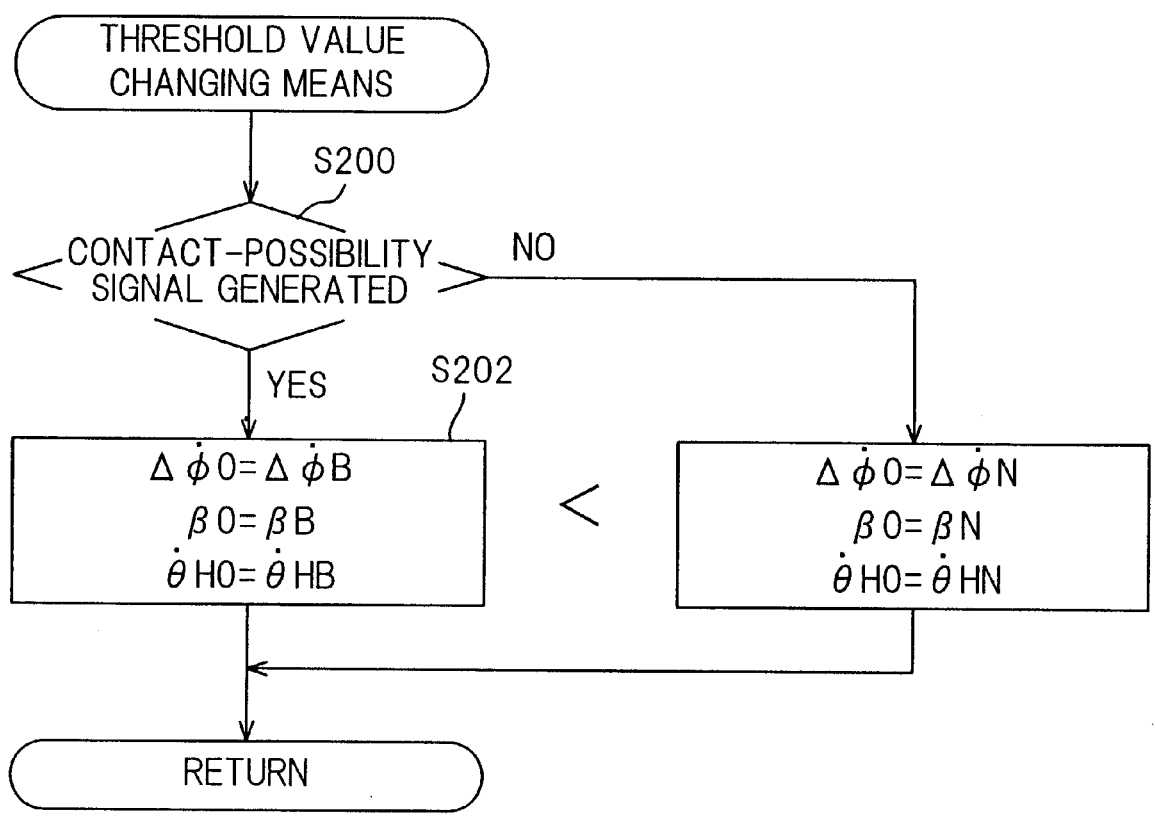
FIG. 7 is a flow chart showing the subroutine of threshold value changing referred to in the flow chart of FIG. 6.

FIG. 7 is a flow chart showing the subroutine of this determination.

Explaining the flow chart, the program begins in S200 in which it is determined whether the contact-possibility signal is input or received. When the result is affirmative, the program proceeds to S202 in which three kinds of threshold values, i.e., yaw rate error $\Delta\phi$dot 0, vehicle slip angle $\beta$0 and the steer angular velocity $\theta$dot H0 are changed (or determined) as $\Delta\phi$dot B, $\beta$B and $\theta$dot HB.

On the other hand, when the result in S200 is negative, the program proceeds to S204 in which the threshold values are changed (or determined) as $\Delta\phi$dot N, $\beta$N and $\theta$dot HN.

The yaw rate error $\Delta\phi$dot 0 is an error between a reference yaw rate $\phi$dot S intended to be generated by the vehicle driver's steering and the detected yaw rate $\phi$dot, and is calculated as ($\Delta\phi$dot 0=$\phi$dot−$\phi$dot S). The vehicle slip angle $\beta$0 means the slip angle of the vehicle 10 in the transverse (sidewise) direction relative to the vehicle course of travel, and is calculated from the detected vehicle speed, the detected lateral acceleration and the detected yaw rate.

The steer angular velocity $\theta$dot H0 is the angular velocity of the steering-wheel movement and is calculated by obtaining the differential or difference between the detected steer angles.

These threshold values are reference values to be used in determining whether the braking force left-and-right distribution for vehicle behavior control be conducted. The values $\Delta\phi$dot B, $\beta$B and $\theta$dot HB are determined to be less than the values $\Delta\phi$dot N, $\beta$N and $\theta$dot HN.

Therefore, when the result in S200 is affirmative (the possibility of contact is great), the threshold values are determined such that the calculation of the manipulated variables is advanced (expedited) in order that the vehicle behavior control is at an earlier stage compared to the case when the result is negative.

Returning to the explanation of FIG. 6, the program proceeds to S102 in which the control maps are changed or determined.

Figure 8:
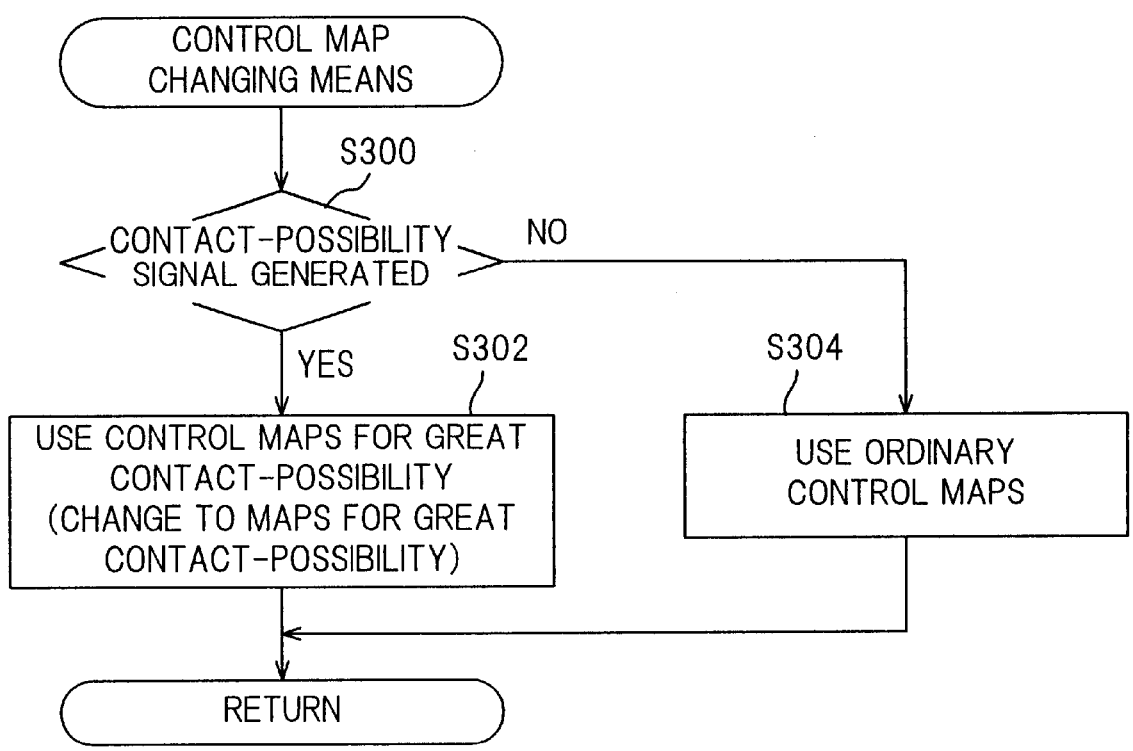
FIG. 8 is a flow chart showing the subroutine of control map (mapped data) changing referred to in the flow chart of FIG. 6.

FIG. 8 is a flow chart showing the subroutine for this procedure, which is conducted by the aforesaid control map changing means 44*f*.

The program starts in S300 in which it is again determined whether the contact-possibility signal is input or received. When the result is affirmative, the program proceeds to S302 in which the characteristics of three kinds of control maps (which are retrieved using the three threshold values $\Delta\phi$dot B(N), $\beta$B(N) and $\theta$dot HB(N) as address data) are changed or determined to those for the case where the possibility of contact is great.

On the other hand, when the result in S300 is negative, the program proceeds to S304 in which the characteristics of the control maps are changed or determined to be those for ordinary control.

Figure 9:
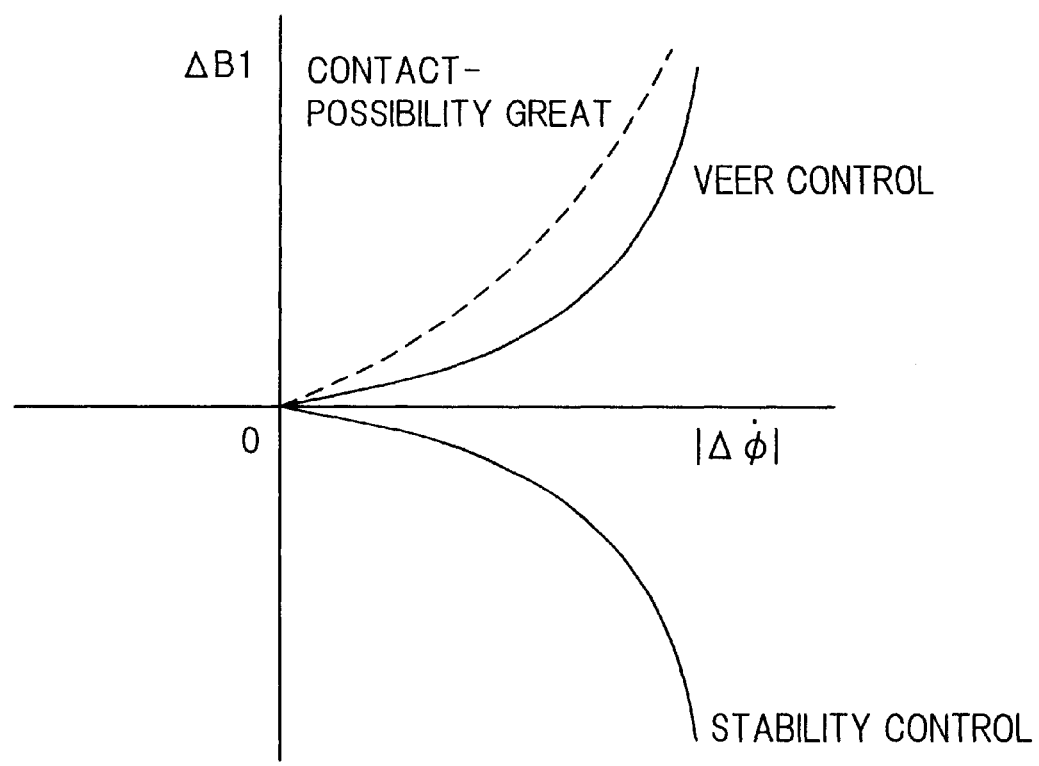
FIG. 9 is a graph showing the characteristics of control maps (mapped data) to be used in the calculation of a braking force difference referred to in the flow chart of FIG. 6.

FIG. 9 is a graph showing the characteristics of the control maps to be retrieved from the yaw rate error. In the figure, the solid lines illustrate the control map (characteristics) for the ordinary control when the possibility of contact is not great, while the broken lines illustrate the control map (characteristics) when the possibility of contact is great.

Again returning to the explanation of FIG. 6, the program then proceeds to S104 in which the detected running conditions of the subject vehicle 10 such as the vehicle speed, the lateral (transverse) acceleration, yaw rate, etc., are again read.

The program then proceeds to S106 in which the parameters relating to the vehicle behavior, more particularly, the yaw rate error $\Delta\phi$dot, the vehicle slip angle $\beta$ and the steer angular velocity $\theta$H, for conducting the braking force left-and-right distribution control are calculated or determined.

As mentioned above, the yaw rate error $\Delta\phi$dot is calculated as $$\Delta\phi\text{dot}=\phi\text{dot}-\phi\text{dot S},$$

and in this step it is determined whether the signs (i.e., positive or negative) of $\Delta\phi$dot and $\phi$dot S are the same.

When the signs of these values are not the same, since this means the yaw rate is insufficient and the vehicle behavior is under understeering, it is determined that a control to correct understeering, referred to hereinafter as "veer control", should be conducted. More specifically, the vehicle is controlled to veer in when the vehicle understeers. When the signs of these values are the same, on the contrary, since this means that the yaw rate is excessive, it is determined that a control to restore the vehicle behavior, referred to hereinafter as "stability" control, should be made.

The reference yaw rate $\phi$dot S indicates a desired yaw rate that the vehicle 10 should generate as mentioned before. The reference yaw rate has been determined through experimentation based on the steer angle and vehicle speed and using predetermined characteristics of transfer function of the vehicle 10. The vehicle transfer function characteristics will be explained later in the second embodiment.

In the flow chart of FIG. 6, the program then proceeds to S108 in which the detected or calculated yaw rate error $\Delta\phi$dot, vehicle slip angle $\beta$ and steer angular velocity $\theta$dot H are respectively compared with the threshold values $\Delta\phi$dot B(N), vehicle slip angle $\beta$B(N) and steer angular velocity $\theta$dot HB(N) to determine whether all (or at least one) of the detected values are not less than the corresponding threshold values.

When the result in S108 is negative and none of the detected values is not more than the corresponding threshold value, the program skips the following steps. On the other hand, when the result in S108 is affirmative and at least one of the detected value is not less than the corresponding threshold value, the program proceeds to S110 in which a braking force difference $\Delta$B is calculated as shown.

In the right side of the equation, the 1st term is a yaw rate error component, the 2nd term is a vehicle body slip angle component and the 3rd term is a steer angular velocity component.

Figure 10:
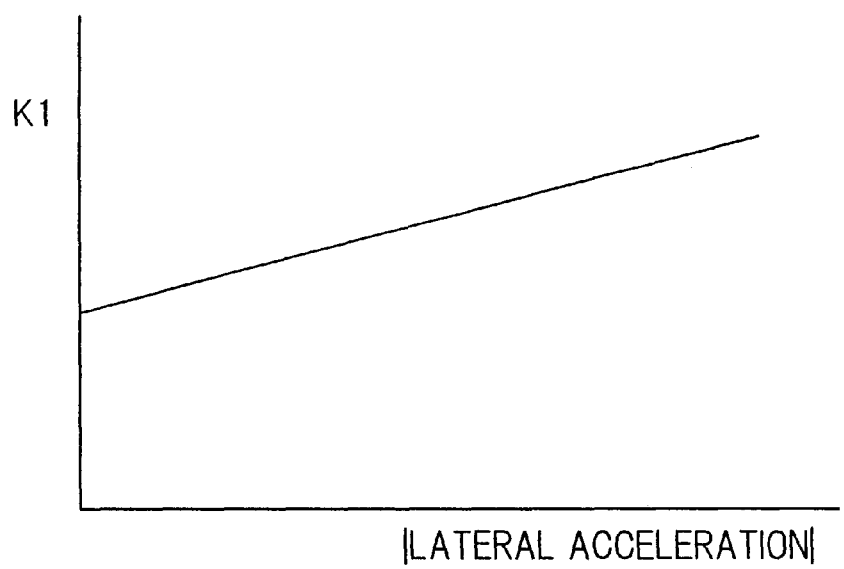
FIG. 10 is a graph showing the characteristics of a coefficient map (mapped data) to be used in the calculation of a braking force difference referred to in the flow chart of FIG. 6.

The yaw rate error component is determined by calculating the product of a coefficient ΔB 1 and another coefficient K1. As illustrated in FIG. 9, the first coefficient ΔB1 is set to increase as the absolute value of the yaw rate error Δφdot increases. As illustrated in FIG. 10, the second coefficient K1 is set to increase as the absolute value of the longitudinal acceleration(which is the acceleration acted on the vehicle 10 parallel to the vehicle course of travel and is determined by calculating the differential or difference of the detected vehicle speed). Regarding the first coefficient ΔB1, a positive value for the veer control is used when the vehicle is understeering, while a negative value for the stability control is used when the vehicle is oversteering.

Figure 11:
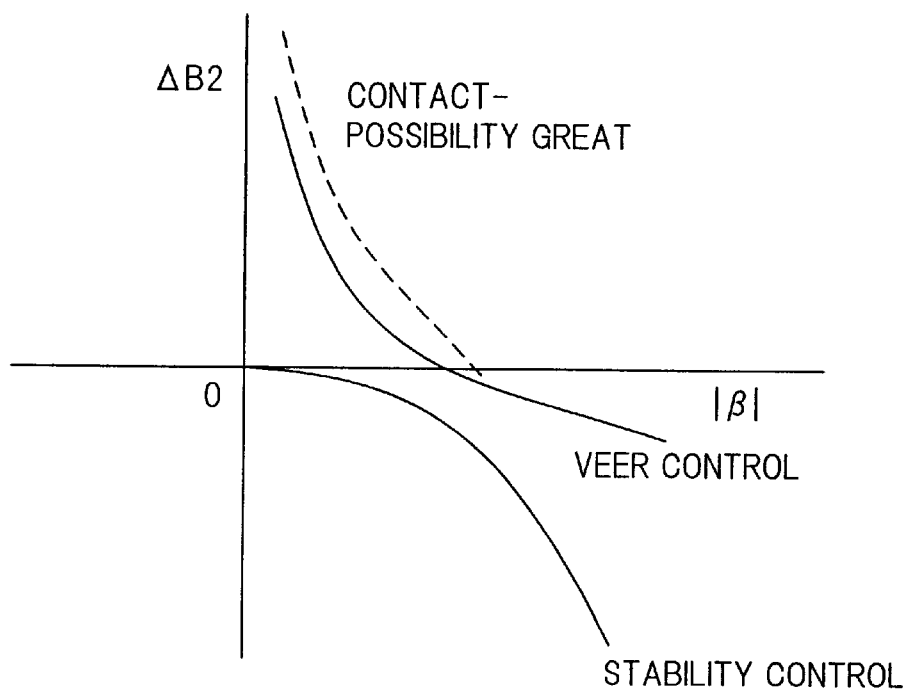
FIG. 11 is a graph showing the characteristics of other control maps (mapped data) to be used in the calculation of a braking force difference referred to in the flow chart of FIG. 6.
Figure 12:
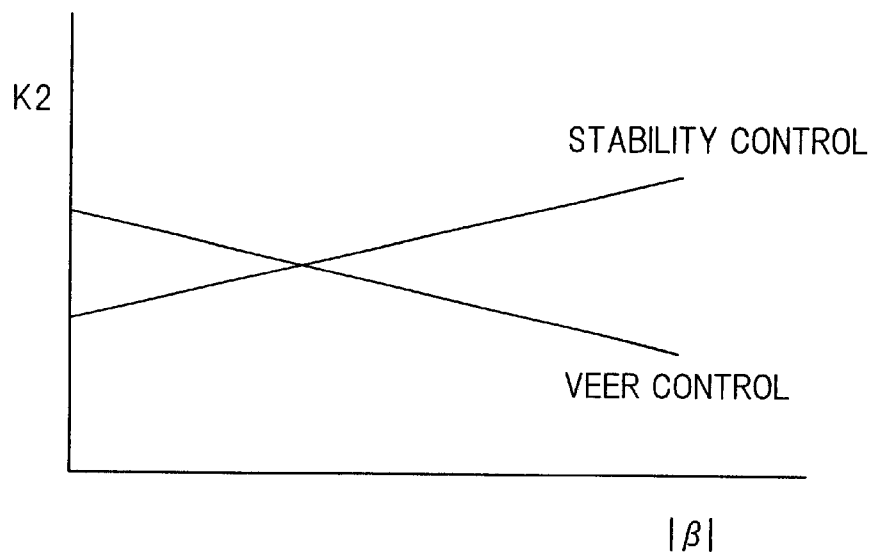
FIG. 12 is a graph showing the characteristics of another coefficient map (mapped data) to be used in the calculation of a braking force difference referred to in the flow chart of FIG. 6.

The vehicle slip angle component is determined by calculating the product of a coefficient ΔB2 and a coefficient K2. As illustrated in FIG. 11, the first coefficient ΔB2 is set with respect to the absolute value of the vehicle slip angle β. As illustrated in FIG. 12, the coefficient K2 is set with respect to the absolute value of the vehicle slip angular velocity βdot (which is determined by calculating the differential or the difference between the consecutively detected vehicle slip angles β).

As regards the coefficient ΔB2, a positive value for the veer control is similarly used when the vehicle is understeering, while a negative value for the stability control is similarly used when the vehicle is oversteering.

Figure 13:
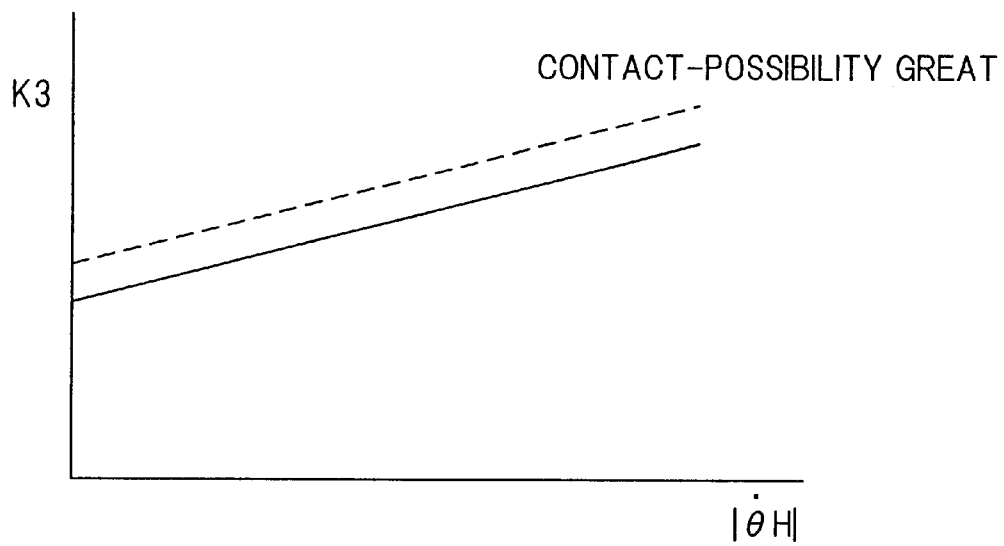
FIG. 13 is a graph showing the characteristics of still another coefficient map (mapped data) to be used in the calculation of a braking force difference referred to in the flow chart of FIG. 6.

The steer angular velocity component is determined by calculating the product of the aforesaid coefficient ΔB1 and another coefficient K3. As illustrated in FIG. 13, the second coefficient K3 is set to increase as the absolute value of the steer angular velocity θdot increases. By again using the coefficient ΔB1 (which increases with increasing yaw rate error), it becomes possible to enhance the control response in tracking the reference yaw rate.

The braking force difference to the left and right wheels (manipulated variable) ΔB is thus determined by calculating the products of the coefficients and by summing the products. The braking force difference is determined to be increased in order that the vehicle veerability is enhanced than ordinary.

Again returning to the explanation of FIG. 6 flow chart, the program proceeds to S112 in which the braking force distribution is determined for the left wheels WFL, WRL and the right wheels WFR, WRR such that the calculated braking force difference ΔB is attained between the left and right wheels.

Specifically, the distribution of the braking forces to the respective wheels is determined taking the critical performance of wheel (tires) into account, based on the longitudinal acceleration, the change in the load pressing the wheels (rubber tires) onto the road surface due to cornering, the braking forces, the motive force, the lateral or transverse force, etc.

More specifically, under the veer control when the vehicle 10 tends to understeer, the braking forces are distributed to the left and right wheels W such that the braking forces at the inner wheels are greater than those at the outer wheels in that the vehicle is caused to veer in. On the other hand, under the stability control when the vehicle 10 tends to oversteer, the braking forces are distributed to the left and right wheels W such that the braking forces at the inner wheels are less than those at the outer wheels.

The program then proceeds to S114 in which the hydraulic pressure, more specifically the pressures of oil to be supplied to the brake calipers of the left wheels WFL, WRL and the right wheels WFR, WRR is determined based on the determined hydraulic pressure, and to S116 in which the actuator 12 is operated.

At this time, when result in S300 in the flow chart of FIG. 8 is affirmative, in other words when it is perceived that the possibility of contact is great, the characteristics of the control map (shown in FIGS. 9, 11 and 13) are changed from those illustrated in solid lines to those illustrated in broken lines, making the values ΔB1, ΔB2, ΔB3 (to be retrieved) larger. As a result, the braking force difference (manipulated variables) ΔB is determined to be larger and hence, the manipulated variable for the stability control is increased.

Having been configured in the foregoing manner, this embodiment makes it possible to integrate the obstacle avoidance control and the vehicle behavior control properly and to effect the vehicle driving behavior sufficient for avoiding an obstacle present on the course of travel, while ensuring the steerability of vehicle.

More specifically, the embodiment makes it possible to prevent the interference with the vehicle driver's steering from occurring under ordinary driving, while, under the running conditions in which the possibility of contact with the obstacle is great, conducting the veer control more effectively compared to the ordinary driving. With the arrangement, if the vehicle driver steers to avoid the obstacle, contact with the obstacle can securely be avoided.

Moreover, since the determination of the manipulated variable is advanced (expedited) relative to that for ordinary driving, the arrangement can bring the vehicle behavior to that intended by the vehicle driver.

Furthermore, by increasing the manipulated variable, the arrangement can develop a yaw moment greater than that at ordinary driving, enabling enhancement of the vehicle's veerability so as to securely avoid contact with the obstacle.

More concretely, the braking force left-and-right distribution control means conducts the braking force distribution properly, when the vehicle driver steers by himself at the time that the possibility of contact is great. Accordingly, even if the vehicle tends to understeer, this will immediately be reduced such that the vehicle steerability and veerability will be ensured. Thus, the braking force distribution control takes effect instantaneously, enhancing the vehicle veerability.

At this instant, if the vehicle driver realizes the automatic braking control, since he has been informed that the possibility of contact is great, he does not experience annoyance. As mentioned above, even if the vehicle steerability is degraded due to sharp braking, the braking force distribution will restore the vehicle steerability quickly, ensuring avoidance of an obstacle securely.

Figure 14:
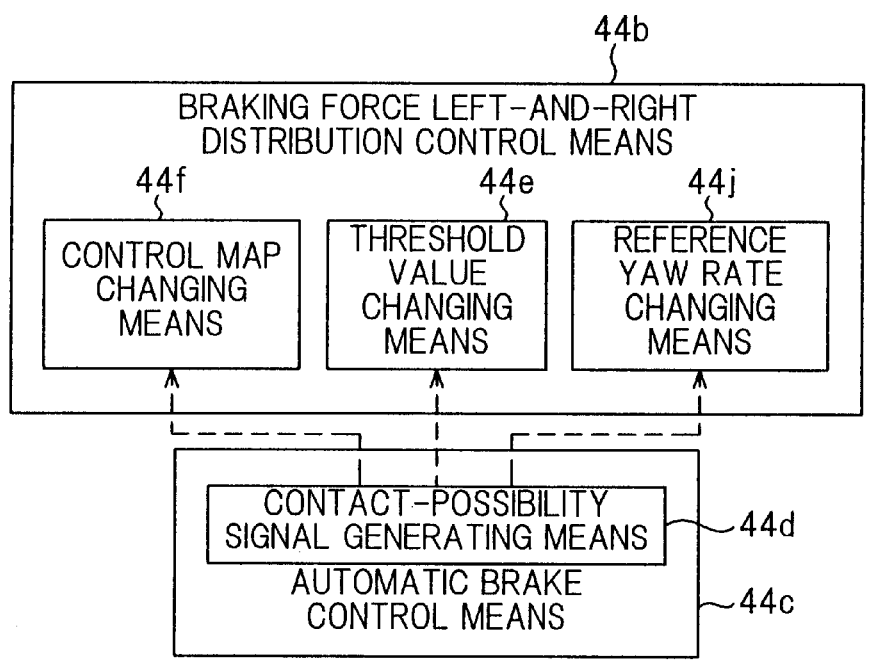
FIG. 14 is a block diagram, partially similar to FIG. 3, but partially showing the details of an electronic control unit (ECU) provided in the system according to a second embodiment of the invention.

FIG. 14 is a partial block diagram, similar to the part of that shown in FIG. 3, but partially showing the configuration of a second embodiment of the integrated vehicle control system according to the invention.

In the second embodiment, as illustrated, the braking force left-and-right distribution control means 44b is added with a reference yaw rate changing means 44j. The reference yaw rate changing means changes the calculation of the reference yaw rate φdot S in response to the contact-possibility signal.

Figure 15:
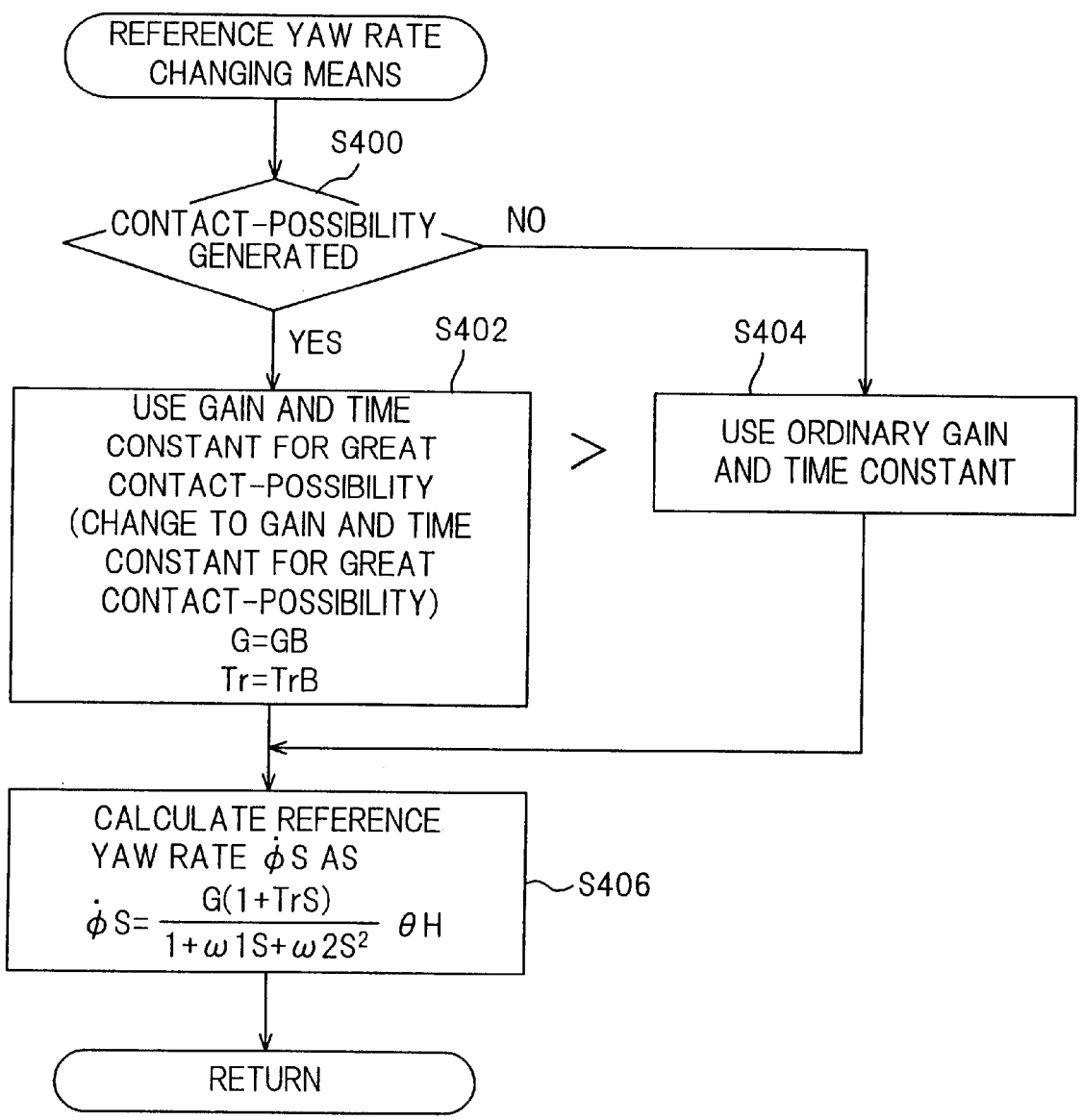
FIG. 15 is a flow chart showing the operation of the system according to the second embodiment of the invention, more particularly the operation of a reference yaw rate changing means illustrated in FIG. 14.

FIG. 15 is a flow chart showing the operation of the system according to the second embodiment, more specifically, the operation of the reference yaw rate changing means 44j.

Explaining this, the program starts at S400 in which it is determined whether the contact-possibility signal is input or received and if it is, the program proceeds to S402 in which a gain G and a time constant Tr of the aforesaid transfer function (describing the vehicle behavior) to be used for calculating the reference yaw rate are changed or determined as GB and TrB.

On the other hand, when the result in S400 is negative, the program proceeds to S404 in which the gain G and the time constant Tr are changed or determined as GN and TrN. The gain GN and time constant TrN are based on values obtained through experimentation, and are the same as those used in the first embodiment. The gain GB is set to be larger than GN, and the time constant TrB is set to be larger than TrN.

The program then proceeds to S406 in which the reference yaw rate φdot S is calculated in accordance with the equation shown there. In the equation, ω1 and ω2 of the transfer function are coefficients concerning the vibrational properties of the vehicle 10 and remain the same irrespective of whether or not the possibility of contact is great.

The reference yaw rate calculated using the gain and time constants changed or determined in S402 is, accordingly, larger than that calculated using the gain and time constant changed or determined in S404.

As a result, when the possibility of contact is great, the reference yaw rate grows higher and greater, rendering a greater yaw rate error at an earlier stage than the case where the possibility of contact is not great. The yaw rate error thus determined will exceed the threshold value at an earlier time point, expediting the initiation of control relative to that in the case where the possibility of contact is not great.

Moreover, since the yaw rate error becomes relatively large, the braking force difference ΔB increases, enhancing the veerability and response of the control.

Thus, the reference yaw rate is calculated differently in response to the determination result of the possibility of contact in the second embodiment. It be noted, however, that since the output characteristics of the yaw rate relative to the steer angle varies with the vehicle speed, the reference yaw rate should be determined based on the steer angle and vehicle speed, as referred to in the first embodiment.

The other aspects, configurations and advantages of the second embodiment are the same as those of the first embodiment.

Thus, the embodiments are configured to have a system for controlling the behavior of a vehicle (10) having a brake (brake caliper B, actuator 12, master cylinder 14, foot brake 18, master-back 20) which is controllable in a braking force applied to a left wheel (WFL, WRR) and a right wheel (WFR, WRR) of the vehicle independently, including: obstacle detecting means (laser radar 66, radar output processing unit, radar control means 44h, S10–S18) for detecting an obstacle present ahead on a course of travel of the vehicle (10); contact possibility determining means (automatic brake control means 44c, S22) for determining whether a possibility that the vehicle will come into contact with the obstacle is present based on an output of the obstacle detecting means; and first brake control means (automatic brake control means 44c, S26–S28) for controlling operation of the brake in response to a result of the determination of the contact possibility determining means; characterized in that: the system comprises: vehicle behavior detecting means (yaw rate sensor 58, etc., automatic brake control means 44c, S20) for detecting at least a parameter (yaw rate φdot) of the vehicle (10) indicative of behavior of the vehicle (10); vehicle behavior control (manipulated variable calculating) means (braking force left-and-right distribution control means 44b, S100–S110) for calculating at least an error (yaw rate error Δφdot), for controlling a vehicle behavior, between the detected parameter (φdot) and a reference value (reference yaw rate φdot S) and for calculating a manipulated variable (braking force difference ΔB) such that a vehicle veerability is enhanced; second brake control means (braking force left-and-right distribution control means 44b, S112–S116) for controlling operation of the brake in response to the calculated manipulated variable; and wherein: the vehicle behavior control (manipulated variable calculating) means conducts at least one from among procedures to advance the timing of the calculation (i.e., expedite the calculation) of the manipulated variable and to increase the manipulated variable, when the contact possibility determining means (automatic brake control means 44c, S22) determines that the possibility of contact is present. (S202, S302).

With the arrangement, it becomes possible to integrate the obstacle avoidance control and the vehicle behavior control properly and to effect the vehicle driving behavior sufficient for avoiding an obstacle present on the course of travel, while ensuring the steerability of vehicle. More specifically, it becomes possible to prevent the interference with the vehicle driver's steering from occurring under ordinary driving, while, under the running conditions in which the possibility of contact with the obstacle is great, conducting the veer control more effectively compared to the ordinary driving. As a result, if the vehicle vehicle driver steers to avoid the obstacle, the contact with the obstacle can securely be avoided. Moreover, since the determination of the manipulated variable is advanced (expedited) relative to that for ordinary driving, the arrangement can bring the vehicle behavior to that intended by the vehicle driver. Furthermore, by increasing the manipulated variable, the arrangement can develop a yaw moment greater than that at ordinary driving, enabling to enhance the vehicle veerability so as to securely avoid contact with the obstacle.

In the system, the vehicle behavior control (manipulated variable calculating) means includes: error calculating means (threshold value changing means 44e, S104, S106) for calculating the error (yaw rate error Δφdot) between the detected parameter (φdot) and the reference value (reference yaw rate φdot S); comparing means (threshold value changing means 44e, S108) for comparing the error with a first threshold value (Δφdot0); manipulated variable calculating means (braking force left-and-right distribution control means 44b, S110) for calculating the manipulated variable (braking force difference ΔB) when the calculated error is not less than the first threshold value; and threshold changing means (threshold value changing means 44e, S100, S200, S202) for changing the first threshold value in a decreasing direction such that the timing of the calculation of the manipulated variable is advanced, when the contact possibility determining means (automatic brake control means 44c, S22) determines that the possibility of contact is present. (S202, S302).

In the system, the vehicle behavior control means includes: error calculating means (threshold value changing means 44e, S104, S106) for calculating the error (yaw rate error Δφdot) between the detected parameter (φdot) and the reference value (reference yaw rate φdot S); first comparing means (threshold value changing means 44e, S108) for comparing the error with a first threshold value (Δφdot0); second comparing means (threshold value changing means 44e, S108) for comparing a parameter relating to steering (steer angular velocity θdot H) and which is based on the vehicle behavior stability with a second threshold value (θdot H0); manipulated variable calculating means (braking force left-and-right distribution control means 44b, S110)

for calculating the manipulated variable (braking force difference ΔB) based on the error and the parameter relating to steering when the calculated error is not less than the first threshold value or when the parameter relating to steering is not less than the second threshold value; and threshold changing means (threshold value changing means 44e, S100, S200, S202) for changing at least one of the first threshold value and the second threshold value in a decreasing direction such that the timing of the calculation of the manipulated variable is advanced, when the contact possibility determining means (automatic brake control means 44c, S22) determines that the possibility of contact is present. (S202, S302).

In the system, the vehicle behavior control means includes: error calculating means (threshold value changing means 44e, S104, S106) for calculating the error (yaw rate error Δϕdot) between the detected parameter (ϕdot) and the reference value (reference yaw rate ϕdot S); first comparing means (threshold value changing means 44e, S108) for comparing the error with a first threshold value (Δϕdot0); second comparing means (threshold value changing means 44e, S108) for comparing a parameter relating to steering (steer angular velocity θdot H) and which is based on the vehicle behavior stability with a second threshold value (θdot H0); third comparing means (threshold value changing means 44e, S108) for comparing a parameter relating to vehicle slip angle (β) and which is based on the vehicle behavior stability with a third threshold value (β0); manipulated variable calculating means (braking force left-and-right distribution control means 44b, S110) for calculating the manipulated variable (braking force difference ΔB) based on: the error; the parameter relating to steering; and the parameter relating to slip angle, when the calculated error is not less than the first threshold value, or when the parameter relating to steering is not less than the second threshold value, or when the parameter relating to vehicle slip angle is not less than the third threshold value; and threshold changing means (threshold value changing means 44e, S100, S200, S202) for changing at least one of the first threshold value, the second threshold value and the third threshold value in a decreasing direction such that the timing of the calculation of the manipulated variable is advanced, when the contact possibility determining means (automatic brake control means 44c, S22) determines that the possibility of contact is present. (S202, S302).

In the system, the vehicle behavior control means includes: map retrieving means (braking force left-and-right distribution control means 44b, S104, S106) for calculating the error (yaw rate error Δϕdot) between the detected parameter (ϕdot) and the reference value (reference yaw rate ϕdot S) and for retrieving a value from characteristics (control map) using at least the calculated error as an address datum; manipulated variable calculating means (braking force left-and-right distribution control means 44b, S110) for calculating the manipulated variable (braking force difference ΔB) based on the retrieved value; and characteristics changing means (control map changing means 44f, S102, S300, S302) for changing the characteristics to increase the manipulated variable such that the manipulated variable is increased in a direction in which the vehicle veerability is enhanced, when the contact possibility determining means (automatic brake control means 44c, S22) determines that the possibility of contact is present. (S202, S302).

In the system, the vehicle behavior control means includes: first map retrieving means (braking force left-and-right distribution control means 44b, S104, S106) for calculating the error (yaw rate error Δϕdot) between the detected parameter (ϕdot) and the reference value (reference yaw rate ϕdot S) and for retrieving a value from first characteristics (control map) using at least the calculated error as an address datum; second map retrieving means (control map changing means 44f, S104, S106) for retrieving a value from second characteristics using a parameter relating to steering (steer angular velocity θdot H) as an address datum; manipulated variable calculating means (braking force left-and-right distribution control means 44b, S110) for calculating the manipulated variable (braking force difference ΔB) based on the retrieved values; and characteristics changing means (control map changing means 44f, S102, S300, S302) for changing at least one of the first and second characteristics to increase the manipulated variable such that the manipulated variable is increased in a direction in which the vehicle veerability is enhanced, when the contact possibility determining means (automatic brake control means 44c, S22) determines that the possibility of contact is present. (S202, S302).

In the system, the vehicle behavior control means includes: first map retrieving means (braking force left-and-right distribution control means 44b, S104, S106) for calculating the error (yaw rate error Δϕdot) between the detected parameter (ϕdot) and the reference value (reference yaw rate ϕdot S) and for retrieving a value from first characteristics (control map) using at least the calculated error as an address datum; second map retrieving means (braking force left-and-right distribution control means 44c, S104, S106) for retrieving a value from second characteristics using a parameter relating to steering (steer angular velocity ϕdot H) as an address datum; third map retrieving means (braking force left-and-right distribution control means 44c, S104, S106) for retrieving a value from third characteristics using a parameter relating to vehicle slip angle (β) as an address datum; manipulated variable calculating means (braking force left-and-right distribution control means 44b, S110) for calculating the manipulated variable (braking force difference ΔB) based on the retrieved values; and characteristics changing means (control map changing means 44f, S102, S300, S302) for changing at least one of the first, second and third characteristics to increase the manipulated variable such that the manipulated variable is increased in a direction in which the vehicle veerability is enhanced, when the contact possibility determining means (automatic brake control means 44c, S22) determines that the possibility of contact is present. (S202, S302).

In the system, the vehicle behavior control means includes: reference value changing means (reference yaw rate changing means 44j, S400–S402) for changing the reference value (reference yaw rate ϕdot S) such that the timing of the calculation of the manipulated variable is advanced or the manipulated variable is increased, when the contact possibility determining means (automatic brake control means 44c, S22) determines that the possibility of contact is present. (S400).

In the system, the reference value changing means changes the reference value (reference yaw rate ϕdot S) by changing a transfer function describing the behavior of the vehicle (10).

In the system, the reference value changing means changes the reference value (reference yaw rate ϕdot S) by changing at least one of a gain (G) and a time constant (Tr) of the transfer function describing the behavior of the vehicle (10).

In the above, the first and second boundaries are set, as illustrated in FIG. 5, such that alarm or automatic braking will be less likely to take effect as the relative distance or the relative speed increases, i.e., as the distance relative to the obstacle or the vehicle speed relative to the obstacle increases. It is further possible to add similar boundaries separately with respect to the coefficient of tire/road interface friction $\mu$ and to select one from among the boundaries from an estimated coefficient $\mu$ using the detected steer angle, steer torque and vehicle speed.

In the above, although the steer angular velocity is used as the threshold value, it is alternatively possible to use the steer torque. Moreover, the steer angular velocity and the steer torque can both be used in order to detect a rapid steering wheel movement such as that encountered in avoiding an obstacle perceived lately.

In the above, the contact-possibility signal is immediately generated when the relative distance becomes less than the first boundary as illustrated in FIG. 5. Since, however, it suffices if the vehicle driver is alerted to the fact that the possibility of contact is great, it is alternatively possible to delay the signal generation to a given point between the first boundary and the second boundary.

In the above, although the system is configured such that the threshold values and the control map characteristics are wholly changed when the contact-possibility signal is generated, it is alternatively possible to modify the system such that one or some kinds of the values and characteristics are changed upon the signal generation.

In the above, the vehicle behavior control is conducted such that the braking force left-and-right distribution control is effected suitable for, if needed, the automatic braking. It is alternatively possible to conduct the control in the other manner.

For example, it is possible in a four-wheel steering control to effect the veer control by making the steer angles of the rear wheel out of phase with those of the front wheels, while effecting the stability control by making the steer angles of the front and rear wheels in phase.

Alternatively, when the load pressing the tire onto the road surface is controlled, the veer control or the stability control can be effected by increasing or decreasing the distribution of the rigidity to rolling to the rear wheels to some extent. Specifically, if the braking force difference to be distributed to the left and right wheels is replaced with the steer angles or the rigidity to rolling to be distributed to the rear wheels, similar advantages will be attained.

In the above, although an obstacle is detected by the laser radar 66, it is alternatively possible to attain the same result by using an optical sensor such as a CCD camera.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling the behavior of a vehicle having a brake which is controllable in a braking force applied at a left wheel and a right wheel of the vehicle independently, comprising:

obstacle detecting means for detecting an obstacle present ahead on a course of travel of the vehicle;

contact possibility determining means for determining whether a possibility that the vehicle will come into contact with the obstacle is present based on an output of the obstacle detecting means;

first brake control means for controlling operation of the brake in response to a result of the determination of the contact possibility determining means;

vehicle behavior detecting means for detecting at least a parameter of the vehicle indicative of behavior of the vehicle;

vehicle behavior control means for calculating at least an error, for controlling a vehicle behavior, between the detected parameter and a reference value and for calculating a manipulated variable such that a vehicle veerability is enhanced; and second brake control means for controlling operation of the brake in response to the calculated manipulated variable;

wherein:

the vehicle behavior control means conducts at least one from among procedures to advance the timing of the calculation of the manipulated variable and to increase the manipulated variable, when the contact possibility determining means determines that the possibility of contact is present.

2. A system according to claim 1, wherein the vehicle behavior control means includes:

error calculating means for calculating the error between the detected parameter and the reference value;

comparing means for comparing the error with a first threshold value;

manipulated variable calculating means for calculating the manipulated variable when the calculated error is not less than the first threshold value; and threshold changing means for changing the first threshold value in a decreasing direction such that the timing of the calculation of the manipulated variable is advanced, when the contact possibility determining means determines that the possibility of contact is present.

3. A system according to claim 1, wherein the vehicle behavior control means includes:

error calculating means for calculating the error between the detected parameter and the reference value;

first comparing means for comparing the error with a first threshold value;

second comparing means for comparing a parameter relating to steering and which is based on the vehicle behavior stability with a second threshold value;

manipulated variable calculating means for calculating the manipulated variable based on the error and the parameter relating to steering when the calculated error is not less than the first threshold value or when the parameter relating to steering is not less than the second threshold value; and threshold changing means for changing at least one of the first threshold value and the second threshold value in a decreasing direction such that the timing of the calculation of the manipulated variable is advanced, when the contact possibility determining means determines that the possibility of contact is present.

4. A system according to claim 1, wherein the vehicle behavior control means includes:

error calculating means for calculating the error between the detected parameter and the reference value;

first comparing means for comparing the error with a first threshold value;

second comparing means for comparing a parameter relating to steering and which is based on the vehicle behavior stability with a second threshold value;

third comparing means for comparing a parameter relating to vehicle slip angle and based on the vehicle behavior stability with a third threshold value;

manipulated variable calculating means for calculating the manipulated variable based on: the error; the parameter relating to steering; and the parameter relating to vehicle slip angle, when the calculated error is not less than the first threshold value, or when the parameter relating to steering is not less than the second threshold value, or when the parameter relating to vehicle slip angle is not less than the third threshold value; and threshold changing means for changing at least one of the first threshold value, the second threshold value and the third threshold value in a decreasing direction such that the timing of the calculation of the manipulated variable is advanced, when the contact possibility determining means determines that the possibility of contact is present.

5. A system according to claim 1, wherein the vehicle behavior control means includes:

map retrieving means for calculating the error between the detected parameter and the reference value and for retrieving a value from characteristics using at least the calculated error as an address datum;

manipulated variable calculating means for calculating the manipulated variable based on the retrieved value; and characteristics changing means for changing the characteristics to increase the manipulated variable such that the manipulated variable is increased in a direction in which the vehicle veerability is enhanced, when the contact possibility determining means determines that the possibility of contact is present.

6. A system according to claim 1, wherein the vehicle behavior control means includes:

first map retrieving means for calculating the error between the detected parameter and the reference value and for retrieving a value from first characteristics using at least the calculated error as an address datum;

second map retrieving means for retrieving a value from second characteristics using a parameter relating to steering as an address datum;

manipulated variable calculating means for calculating the manipulated variable based on the retrieved values; and characteristics changing means for changing at least one of the first and second characteristics to increase the manipulated variable such that the manipulated variable is increased in a direction in which the vehicle veerability is enhanced, when the contact possibility determining means determines that the possibility of contact is present.

7. A system according to claim 1, wherein the vehicle behavior control means includes:

first map retrieving means for calculating the error between the detected parameter and the reference value and for retrieving a value from first characteristics using at least the calculated error as an address datum;

second map retrieving means for retrieving a value from second characteristics using a parameter relating to steering as an address datum;

third map retrieving means for retrieving a value from third characteristics using a parameter relating to vehicle slip angle as an address datum;

manipulated variable calculating means for calculating the manipulated variable based on the retrieved values; and characteristics changing means for changing at least one of the first, second and third characteristics to increase the manipulated variable such that the manipulated variable is increased in a direction in which the vehicle veerability is enhanced, when the contact possibility determining means determines that the possibility of contact is present.

8. A system according to claim 1, wherein the vehicle behavior control means includes:

reference value changing means for changing the reference value such that the timing of the calculation of the manipulated variable is advanced or the manipulated variable is increased, when the contact possibility determining means determines that the possibility of contact is present.

9. A system according to claim 8, wherein the reference value changing means changes the reference value by changing a transfer function describing the behavior of the vehicle.

10. A system according to claim 9, wherein the reference value changing means changes the reference value by changing at least one of a gain and a time constant of the transfer function describing the behavior of the vehicle.

11. A method of controlling the behavior of a vehicle having a brake which is controllable in a braking force applied at a left wheel and a right wheel of the vehicle independently, comprising the steps of:

(a) detecting an obstacle present ahead on a course of travel of the vehicle;

(b) determining whether a possibility that the vehicle will come into contact with the detected obstacle is present;

(c) controlling operation of the brake in response to a result of the determination of the contact possibility;

(d) detecting at least a parameter of the vehicle indicative of behavior of the vehicle;

(e) calculating at least an error, for controlling a vehicle behavior, between the detected parameter and a reference value and for calculating a manipulated variable such that a vehicle veerability is enhanced; and (f) controlling operation of the brake in response to the calculated manipulated variable;

wherein:

(g) conducting at least one from among a set of procedures, including to advance the timing of the calculation of the manipulated variable and to increase the manipulated variable, when the possibility of contact is determined to be present.

12. A method according to claim 11, wherein the step (e) includes:

calculating the error between the detected parameter and the reference value;

comparing the error with a first threshold value;

calculating the manipulated variable when the calculated error is not less than the first threshold value; and changing the first threshold value in a decreasing direction such that the timing of the calculation of the manipulated variable is advanced, when the possibility of contact is determined to be present.

13. A method according to claim 11, wherein the step (e) includes:

calculating the error between the detected parameter and the reference value;

comparing the error with a first threshold value;

comparing a parameter relating to steering and which is based on the vehicle behavior stability with a second threshold value;

calculating the manipulated variable based on the error and the parameter relating to steering when the calculated error is not less than the first threshold value or when the parameter relating to steering is not less than the second threshold value; and changing at least one of the first threshold value and the second threshold value in a decreasing direction such that the timing of the calculation of the manipulated variable is advanced, when the possibility of contact is determined to be present.

14. A method according to claim 11, wherein the step (e) includes:

calculating the error between the detected parameter and the reference value;

comparing the error with a first threshold value;

comparing a parameter relating to steering and which is based on the vehicle behavior stability with a second threshold value;

comparing a parameter, relating to vehicle slip angle and based on the vehicle behavior stability, with a third threshold value;

calculating the manipulated variable based on: the error; the parameter relating to steering; and the parameter relating to slip angle, when the calculated error is not less than the first threshold value, or when the parameter relating to steering is not less than the second threshold value, or when the parameter relating to vehicle slip angle is not less than the third threshold value; and changing at least one of the first threshold value, the second threshold value and the third threshold value in a decreasing direction such that the timing of the calculation of the manipulated variable is advanced, when the possibility of contact is determined to be present.

15. A method according to claim 11, wherein the step (e) includes:

calculating the error between the detected parameter and the reference value and for retrieving a value from characteristics using at least the calculated error as an address datum;

calculating the manipulated variable based on the retrieved value; and changing the characteristics to increase the manipulated variable such that the manipulated variable is increased in a direction in which the vehicle veerability is enhanced, when the possibility of contact is determined to be present.

16. A method according to claim 11, wherein the step (e) includes:

calculating the error between the detected parameter and the reference value and for retrieving a value from first characteristics using at least the calculated error as an address datum;

retrieving a value from second characteristics using a parameter relating to steering as an address datum;

calculating the manipulated variable based on the retrieved values; and changing at least one of the first and second characteristics to increase the manipulated variable such that the manipulated variable is increased in a direction in which the vehicle veerability is enhanced, when the possibility of contact is determined to be present.

17. A method according to claim 11, wherein the step (e) includes:

calculating the error between the detected parameter and the reference value and for retrieving a value from first characteristics using at least the calculated error as an address datum;

retrieving a value from second characteristics using a parameter relating to steering as an address datum;

retrieving a value from third characteristics using a parameter relating to vehicle slip angle as an address datum;

calculating the manipulated variable based on the retrieved values; and changing at least one of the first, second and third characteristics to increase the manipulated variable such that the manipulated variable is increased in a direction in which the vehicle veerability is enhanced, when the possibility of contact is determined to be present.

18. A method according to claim 17, wherein the step (e) includes:

changing the reference value such that the timing of the calculation of the manipulated variable is advanced or the manipulated variable is increased, when the possibility of contact is determined to be present.

19. A method according to claim 18, wherein changing the reference value by changing a transfer function describing the behavior of the vehicle.

20. A method according to claim 19, wherein changing the reference value by changing at least one of a gain and a time constant of the transfer function describing the behavior of the vehicle.

* * * * *